(12) United States Patent
Seufert et al.

(10) Patent No.: US 8,037,858 B2
(45) Date of Patent: Oct. 18, 2011

(54) METHOD FOR CONTROLLING THE START-UP PHASE OF A MOTOR VEHICLE

(75) Inventors: Martin Seufert, Steinheim (DE); Frank Thullner, Untergruppenbach (DE); Ralph Richter, St. Georgen/Peterzell (DE); Josef Glatthaar, Oberndorf (DE); Roberto Tirelli, Bari (IT); Vincenzo De Gioia, Molfetta (IT); Reinhard Klein, Villingen-Schwenningen (DE); Jurgen Wagner, Hohenems (AT); Richard Schneider, Graz (AT); Gusztav Gulyas, Graz (AT); Peter Ebner, Graz (AT); Stefan Strobl, Maria Saal (AT)

(73) Assignees: AVL List GmbH, Graz (AT); Getrag Innovationscenter Getriebe-und Zahnradfabrik Hermann Hagenmeyer GmbH & CIE KG, Untergruppenbach (DE); ATB Technologies GmbH, Lustenau (AT)

( * ) Notice: Subject to any disclaimer, the term of this patent is extended or adjusted under 35 U.S.C. 154(b) by 0 days.

(21) Appl. No.: 12/588,254

(22) Filed: Oct. 8, 2009

(65) Prior Publication Data

US 2010/0106394 A1 Apr. 29, 2010

Related U.S. Application Data

(62) Division of application No. 11/578,170, filed as application No. PCT/AT2005/000128 on Apr. 14, 2005, now Pat. No. 7,610,891.

(30) Foreign Application Priority Data

| Apr. 16, 2004 | (AT) | A 660/2004 |
| Apr. 27, 2004 | (AT) | A 725/2004 |
| Apr. 27, 2004 | (AT) | A 726/2004 |
| Apr. 27, 2004 | (AT) | A 727/2004 |

(51) Int. Cl.
*F02N 11/00* (2006.01)
*F02N 15/02* (2006.01)
*F02N 11/04* (2006.01)
*H02K 23/52* (2006.01)
*H02P 9/04* (2006.01)
*B60K 1/00* (2006.01)

(52) U.S. Cl. ............ 123/179.25; 290/46; 180/65.1

(58) Field of Classification Search ............ 123/179.25; 180/65.1, 65.21, 65.2; 290/46, 47, 48
See application file for complete search history.

(56) References Cited

U.S. PATENT DOCUMENTS

| 6,040,634 | A * | 3/2000 | Larguier | 290/45 |
| 6,247,548 | B1 * | 6/2001 | Hayashi et al. | 180/206.2 |
| 6,528,959 | B2 * | 3/2003 | Kitano et al. | 318/55 |
| 6,838,779 | B1 * | 1/2005 | Kandil et al. | 290/31 |
| 2002/0007974 | A1 * | 1/2002 | Nagano et al. | 180/65.2 |
| 2004/0060753 | A1 * | 4/2004 | Ito et al. | 180/65.2 |
| 2004/0065490 | A1 * | 4/2004 | Saito et al. | 180/65.1 |
| 2004/0173174 | A1 * | 9/2004 | Sugino et al. | 123/179.28 |

* cited by examiner

*Primary Examiner* — Erick Solis
*Assistant Examiner* — Sizo B Vilakazi
(74) *Attorney, Agent, or Firm* — Dykema Gossett PLLC

(57) ABSTRACT

A method for controlling the start-up phase of a motor vehicle driven by an internal combustion engine (12) wherein the internal combustion engines (12) is started by an electrical machine (16) that can be operated as a motor, a preferably automatically atuatable clutch (50) being located in the drive train (11) between the internal combustion engine (12) and the electrical machine (16). A faster start-up response can be achieved if the internal combustion engine (12) is driven by the electrical machine (16) when the clutch (50) is engaged during start-up, and if the clutch capacitance ($M_K$) is reduced according to a defined parameter, preferably the engine speed, the time or the torque ($M_E$) of the electrical machine (16) or similar.

16 Claims, 11 Drawing Sheets

METHOD FOR CONTROLLING THE START-UP PHASE OF A MOTOR VEHICLE

CROSS-REFERENCE TO RELATED APPLICATIONS

This application is a division of application Ser. No. 11/578,170, filed Dec. 5, 2006, now U.S. Pat. No. 7,610,891, which was a U.S. national phase of PCT/AT2005/000128, filed Apr. 14, 2005, which claimed priority of Austrian application A 660/2004, filed Apr. 16, 2004, Austrian application A 725/2004, filed Apr. 27, 2004, Austrian application A 726/2004, filed Apr. 27, 2004, and Austrian application A 727/2004, filed Apr. 27, 2004. All priorities are claimed.

BACKGROUND OF THE INVENTION

1. Field of the Invention

U.S. Pat. No. 6,244,368 B1 describes a hybrid vehicle with an electromotor and an internal combustion engine. When the internal combustion engine is started during an electric drive mode by the electromotor, its driving power is increased to the extent of the required starting power for the internal combustion engine.

The invention relates to a method for controlling the start-up phase of a motor vehicle which is driven by an internal combustion engine, the start of the internal combustion engine occurring by means of at least one electrical machine that can be operated as a motor, and there is a preferably automatically actuatable clutch in the drive train between the internal combustion engine and the electrical machine.

The invention further relates to a method for controlling the start-up phase of motor vehicles which are driven by an internal combustion engine and comprise an automatically actuated clutch, with the internal combustion engine being accelerated by a starter from standstill at first, with the engagement process of the clutch being startable from a predetermined threshold speed in order to initiate the start-up phase and with the injection process being started at a time after a synchronization time.

The term synchronization means that the motor control unit can recognize the absolute angle in which the crankshaft of the internal combustion engine is situated momentarily. This contains the information in which part of the cycle the individual cylinders are situated. As a result of the usually employed sensor system, this is only possible after passing a certain angle after a first-time movement of the crankshaft.

The invention also relates to a method for starting an internal combustion engine for a vehicle, with the crankshaft of the internal combustion engine being connected via at least one separable clutch to a drive train comprising a transmission, which drive train comprises at least one electrical machine, with the crankshaft of the internal combustion engine being brought to a predefined starting rotating position in a start preparation phase preferably by the electrical machine, with the angular speed and the angular position of the crankshaft being determined by a vehicle speed sensor during operation.

The invention further relates to a method for reducing transmission noises for a drive train of a vehicle with an internal combustion engine acting upon a drive shaft and an electrical machine which is connected via a transfer box with the drive shaft, with an actuatable clutch being arranged between internal combustion engine and transfer box.

2. The Prior Art

In order to meet mobility requirements of the future, motor vehicles must meet a number of additional requirements. Special attention is given to disturbance caused pollution and noise in discussions on environmental policy. As a result of international treaties, the legislator has prescribed drastic reductions of the fleet emissions of $CO_2$ and fleet consumption.

In addition to the goals under environmental policy, it is also necessary to consider the demands of the worldwide markets and the vehicle users. The trend towards more safety and comfort in the construction of motor vehicles and the increasing share of vans and so-called SUVs (Sport Utility Vehicles) lead to an increase in vehicle weights and thus make reaching consumption and emission goals more difficult. It is also not possible to entirely forget the emotional factor of mobility. Driving fun and pleasure are important aspects without which it is not possible to market cars.

In order to meet the contradictory goals of reduction of consumption and emissions on the one hand and comfort and drivability on the other hand, it is necessary to apply a systemic approach by including the entire drive train.

The functions of motor vehicles are increasingly automated. This relates especially to the process of start-up of motor vehicles. When a motor vehicle is to move from standstill with idle engine it is necessary to start the internal combustion engine first and then to engage the clutch in order to produce positive engagement between internal combustion engine and drive wheels. The time period is critical which passes between the initiation of the starting process and the start of acceleration of the motor vehicle. The acceptance of automated systems by the car driver depends essentially on whether it is managed to minimize objective criteria in respect of delay time, noise and juddering and to optimize subjective criteria.

In conventional systems, the internal combustion engine is accelerated first by the starter without performing any injection so as to avoid deteriorating the exhaust gas limit values by the emission of unburned hydrocarbons. The first injection process is performed after a synchronization time at which the phase position of the piston and the valves are in a permissible area on the one hand and the engine speed is sufficiently high to ensure secure combustion on the other hand. From the first active injection it can be assumed that the internal combustion engine will supply a positive moment. The start of the engagement process of the clutch is then started, so that after a first idle time the torque can be transmitted onto the drive wheels of the motor vehicle and the acceleration process starts. The total duration until the start of the acceleration of the motor vehicle depends essentially on the time which passes from the start of the process until the synchronization time. This time period depends on its part on the output of the starter, the moment of inertia and the frictional moment of the internal combustion engine, the required speed at the synchronization time and the phase position of the internal combustion engine at the start of the process.

A reaction moment occurs especially during impulse start via the drive wheels of a rolling vehicle, which reaction moment is noticed by the vehicle passengers as a disturbing jolt.

EP 0 743 216 A2 describes a hybrid vehicle with an internal combustion engine and an electric clutch motor and an electric auxiliary motor. The starting process occurs via the electric clutch motor. Clutch motor and auxiliary motor are triggered in such a way that the torque of the drive shaft acting upon the drive wheels remains constant.

U.S. Pat. No. 6,244,368 B1 describes a hybrid vehicle with an electromotor and an internal combustion engine. When the internal combustion engine is started during an electric drive mode by the electromotor, its driving power is increased to the extent of the required starting power for the internal combustion engine.

A starting and drive unit for an internal combustion engine of a motor vehicle is known from DE 198 58 992 A1, with the internal combustion engine being connectable via a crankshaft and a clutch with a drive train comprising a transfer box. The transfer box is connected with an electrical machine with which various start methods can be performed. Each start method is preceded by a start clarification phase in which the crankshaft is turned by means of the electrical machine and in which the starting conditions are detected with closed clutch, a decision on the subsequent operating phases is made and whose starting parameters are determined. The speed conditions and the speed progress on the input and output side of the clutch are detected in an electric start control device via two speed sensors on both sides of the clutch and a decision is made on the starting method to be employed in a start clarification phase and the starting parameters are determined for this.

Speed sensors used as a standard for determining the crankshaft speed for example are relatively inexpensive, but come with the disadvantage that a determination of the position of the crankshaft is only possible in an imprecise manner and above a minimum speed. Especially in the case of slowly turning crankshafts, the speed sensors can no longer be used for determining the positioning of the crankshaft. Position sensors which are able to provide precise angular information on the position of the crankshaft even at low speed or at a standstill are relatively complex.

DE 198 08 472 A1 describes a method for starting a fuel-injection internal combustion engine of a motor vehicle. In the time preceding the ignition, the engine is brought by a drive at slow speed to such a position that the piston of a cylinder stands at the upper dead center. With the ignition command, the motor is forced to perform a further small rotational movement, then there is injection and ignition. The position of the crankshaft is detected via a separate crankshaft position sensor.

WO 01/88370 A1 describes a start process and a starter apparatus for internal combustion engines, with the crankshaft being turned by an electrical machine to a predetermined starting position. The position of the crankshaft is detected by a separate rotary and position sensor which cooperates with the crankshaft. Such position sensors are relatively costly.

DE 100 62 985 A1 describes a method and a control device for determining the crankshaft angle of an internal combustion engine, with the internal combustion engine being coupled with an electrical machine, such that its rotor is connected in a torsionally rigid manner with the crankshaft. The electrical machine comprises a control device for controlling the same and an apparatus for determining the angular position of the rotor with respect to the stator. For the purpose of determining the crankshaft angle, the current angular position of the rotor is detected by the apparatus for determining the angular position and forwarded to the control device. Then the respective current crankshaft angle is determined in the control device on the basis of the detected angular position values. The crankshaft angle thus determined is then forwarded by the control device to the control unit of the internal combustion engine.

EP 1 113 169 A1 describes a starter arrangement for an internal combustion engine and a method for controlling the starter arrangement during a start and stop process of the internal combustion engine. The starter arrangement contains an electric drive system with an electrical machine which can be connected via a clutch with the internal combustion engine.

When a so-called side-mounted starter generator (SSG) is driven by the internal combustion engine via a clutch, an alternating moment is transmitted via the connecting gear between the electrical machine and the drive train, which is caused by the combustion strokes of the internal combustion engine. When a low generator moment is retrieved via the electrical machine, the transfer moment between internal combustion engine and electrical machine can change in its sign. The flanks of the interposed gearwheels which usually rest rigidly on each other under pretension can detach from each other within the scope of possible play and hit each other again, which is audible in the form of rattling. This case occurs at low speeds, especially at idling speed of the internal combustion engine.

It is the object of the present invention to minimize the time until the start of the power transmission and thus the acceleration of the motor vehicle by optimizing the control of the start-up phase. It is a further object of the invention to at least reduce the reaction moment during impulse start. It is also an object of the invention to minimize the time until the start of the power transmission and thus the acceleration of the vehicle by optimizing the control of the start-up phase and especially the engagement of the clutch. It is a further object to enable in the simplest possible way a positioning of the crankshaft for a starting process. It is further an object of the invention to avoid rattling of the gearbox especially in idling of the internal combustion engine.

SUMMARY OF THE INVENTION

This is achieved in accordance with the invention in such a way that the internal combustion engine is driven with closed clutch during the starting process by the electrical machine and the clutch capacitance of the clutch is at least reduced depending on at least one defined parameter, preferably the engine speed of the internal combustion engine, the motor speed of the electric motor, the time, the torque of the electrical machine or the like, and preferably the automatically actuatable clutch is opened.

During the start of the internal combustion engine in a drive train with an electrical machine, the power transmission occurs between the drive machine and the internal combustion engine via the clutch. According to the state of the art, the clutch will usually be kept closed during the acceleration process of the internal combustion engine until reaching a target speed. Although the procedure allows a secure start, it requires a relatively large amount of time because a gear can be engaged in the transmission only after this and thus the actual moving of the vehicle can be started. The method in accordance with the invention allows saving time in that it is started to separate the clutch even before the injection of fuel is started.

The internal combustion engine is previously accelerated to a speed which is clearly above the minimum speed required for the starting process.

According to the inventive idea it is thus possible to reduce the time for the start-up phase, such that the opening process of the clutch is started even before the moment is transmitted by the electrical machine to the internal combustion engine and the acceleration of the internal combustion engine is continued with a successively increasingly slipping clutch. The drag torque of the internal combustion engine is dependent on the position of the crankshaft. In order to enable transmission of the torque as long as possible on the one hand and to open the clutch rapidly on the other hand, the start of the clutching process is placed after an upper dead center of a piston of the internal combustion engine. The determination of the opening moment can occur in the following ways:

1) By using a means designated as encoder for the precise determination of the position of the rotational angle of the electrical machine, its absolute angle can be read out at all times. This encoder can be used to draw conclusions on the position of the internal combustion engine when at an earlier time an alignment was made between the position sensor of the internal combustion engine and the encoder of the electrical machine. This synchronization or alignment is made in such a way that when the clutch is closed and in the case of a crankshaft speed above a predetermined minimum speed a synchronization is performed between the position sensor and the means for the precise determination of the position of the rotational angle of the electrical machine, with the latter being adjusted to the position sensor.

2) When the torque of the electrical machine follows up the drag torque of the internal combustion engine, it is possible to derive the upper dead center positions of the pistons from the torque curve. Depending on a predetermined parameter, it is thus possible to start the opening of the clutch after an upper dead center position of a piston.

Before the start of the start-up phase, all clutches in the drive train between internal combustion engine and electrical machine are closed and thus the rotational connection between electrical machine and internal combustion engine is produced. If the electrical machine has a connection with the drive wheels, then the same is severed. The electrical machine then drives the internal combustion engine with maximum torque. Upon reaching a setpoint speed, e.g. 500 min$^{-1}$, the clutch capacitance is reduced or the opening of the automatically actuatable clutch is started after an upper dead center position. The injection of the fuel is also started after the start of the opening of the clutch. At the start of the injection process the engine speed should lie at least 100 min$^{-1}$ above a threshold speed at which a secure starting process is possible.

In order to enable engaging the first gear in a very rapid way in automated transmissions, the drive of the electrical machine is deactivated or briefly reversed after the opening of the automatically actuatable clutch. It can also be provided that the automated transmission or a part of the drive train connected with the automated transmission is braked, with a brake torque preferably being applied via the electrical machine.

After the starting process of the internal combustion engine, the clutch is engaged again while simultaneously the acceleration of the motor vehicle begins. After the starting process of the internal combustion engine, it supplies an excessive torque which increases the speed on the one hand and further accelerates the motor vehicle on the other hand.

The method in accordance with the invention allows moving forward the start of the acceleration process of the motor vehicle and thus realizing a substantially faster responding behavior.

The invention further relates to an apparatus for controlling the start-up phase of a motor vehicle which is equipped with an internal combustion engine and an automated clutch, with the apparatus being configured to trigger an electrical machine in order to accelerate the internal combustion engine from standstill, and with the apparatus further being provided to trigger the automated clutch. This apparatus is characterized in accordance with the invention in such a way that the apparatus begins with reducing the clutch torque after an upper dead center position of a piston. The motor control apparatus in accordance with the invention reduces the time until the start of the acceleration process.

The present invention further relates to a motor vehicle with an internal combustion engine and an electrical machine and an automated clutch in the drive train between internal combustion engine and electrical machine and a control apparatus for controlling the start-up phase.

It is provided for reducing the reaction moment during impulse start that the electrical machine is operated during the impulse starting process in such a way that it compensates at least partly or at least reduces the reaction moment of the internal combustion engine. The impulse starting process preferably occurs via the drive wheels.

There are principally two possibilities for control:

1) The drive machine is operated precisely with the drag torque of the internal combustion engine. The clutch capacitance is carried along with precisely the torque of the electrical machine. If jolts occur which are too fast or too high in order to carry along the torque of the electrical machine, then this leads to a slippage of the switchable clutch, as a result of which the jolts are buffered. This method is suitable when the drag torque of the internal combustion engine can be compensated completely by the electrical machine.

2) When the electrical machine is unable to compensate the full drag torque of the internal combustion engine, then it is operated with a medium torque. This torque must be high enough in order to not allow any permanent slippage of the clutch. The clutch is operated with a capacitance which in any case corresponds to that of the torque. If jolts occur by cylinder compressions for example which are higher than the clutch capacitance, then this will lead to a slippage of the clutch and to a buffering of the jolts. If torques occur which are smaller than the medium drag torque, the moment of the internal combustion engine is reduced accordingly.

In order to minimize the time until the start of the power transmission it is advantageous when the time of the start of the engagement process of the clutch lies before the synchronization time.

The relevant finding in connection with the present invention is the finding that in the case of a respective configuration of the system components the engine speed is considerably higher at the synchronization time than the threshold speed at which a starting process is successfully possible. In the method in accordance with the invention, there is an acceleration of the internal combustion engine at first with fully opened clutch up to a first speed which lies over the minimum speed which is required for a starting process. As a result of the subsequently starting engagement of the clutch the speed of the internal combustion engine sinks while simultaneously the acceleration of the motor vehicle starts. The control occurs in such a way that the speed at the synchronization time is still high enough in order to successfully complete the starting process. The internal combustion engine will then supply an excess torque which on the one hand increases the speed and on the other hand further accelerates the vehicle. The method in accordance with the invention allows moving the start of the acceleration process of the motor vehicle forward and to thus realize a substantially quicker response behavior.

An especially smooth starting behavior can be realized when the end of the engagement process of the clutch lies after the synchronization time. It is thus achieved that the first ignition of the internal combustion engine occurs at a time at which the clutch still has a certain slippage, so that the torque jolts are still absorbed at this time by the clutch to a major part.

In an especially favorable embodiment of the method in accordance with the invention it is provided that the clutch is open at the beginning of the start-up phase, i.e. at standstill of the internal combustion engine. It is also alternatively possible that the clutch is closed at the beginning of the start-up phase, i.e. at standstill of the internal combustion engine and the transmission of the motor vehicle is in the idle position, whereupon the clutch is opened at a first point in time, whereupon at a second point in time a gear is engaged, whereupon at a third point in time the engagement process of the clutch is started and thereafter the injection process is started at a synchronization time. It is advantageous in this variant of the method that even in the case of longer standstill periods it is not necessary to hold the clutch in the opened state.

It is especially preferable when at the beginning of the injection process the engine speed lies at least 100 min$^{-1}$ over the threshold speed at which a secure starting process is possible. A secure starting process can thus be ensured in all operational conditions.

The present invention further relates to an apparatus for controlling the start-up phase of a motor vehicle which is equipped with an internal combustion engine and an automatic clutch, with the apparatus being arranged to trigger a starter in order to accelerate the internal combustion engine from the standstill and to start the engagement process of the clutch in order to initiate the start-up phase and to start the injection process at a synchronization time. This apparatus is characterized in accordance with the invention in such a way that the apparatus determines the start of the engagement time of the clutch prior to the synchronization time. The engine control apparatus in accordance with the invention reduces the time until the start of the acceleration process.

The present invention further relates to a motor vehicle with an internal combustion engine, an automatic clutch and a control apparatus for controlling the start-up phase. The present invention can be applied in an especially advantageous manner on a motor vehicle which is equipped with a starter generator. This is an electrical machine which is coupled in the drive train and which can be used both as a starter as well as a generator.

In order to determine the optimal synchronization time it is especially preferable when the apparatus for controlling the start-up phase is in connection both with a camshaft sensor as well as with a crankshaft sensor. It can thus securely be decided in which cylinder the first injection and thus ignition will occur.

Special advantages are obtained when the transmission of the motor vehicle is arranged as an automatic transmission. It is especially advantageous when the transmission is arranged as a sequential transmission. As described above, a starting process can be performed in this manner without any intervention on the part of the driver, where a closed clutch is assumed at first which is opened at first in order to engage a gear and then performing the actual engagement process. An especially advantageous embodiment of the invention provides that the motor vehicle is equipped with an automatic parking brake which is coupled with the control of the start-up phase. Such an automatic parking brake is a secondary brake which is activated when the vehicle is at a standstill and remains activated for such a time until a sufficient torque is applied to the drive train in order to start the acceleration process. Starting to move on an incline is easily possible with such an automatic parking brake without any special measures by the driver.

In order to meet the various load situations during the start-up, an inclination sensor can appropriately be provided which is connected with the apparatus for controlling the start-up phase. Said inclination sensor measures the inclination of the vehicle body in the longitudinal direction and can thus optionally determine that a start-up process must be performed uphill.

A further relevant load situation is given when there is a heavy load on the motor vehicle. In these cases, a stronger braking of the internal combustion engine must be expected after the start of the engagement process of the clutch, so that the start of the engagement process must be postponed slightly. This situation can be determined by a comparison of the current engine torque with a previously calculated torque which characterizes the state of a vehicle which is unloaded apart from the driver and which has just been moved. This torque can be determined from the start of the clutch engagement by the drop in the speed of the internal combustion engine. Since the loading of a vehicle will not change or change only very rarely during traveling, the previously determined value can be used as an estimate until the new value is determined.

The special advantage of the solution in accordance with the invention is obtained in vehicles which are equipped with start-stop automatic system. Such a start-stop automatic system cuts off the internal combustion engine upon standstill of the motor vehicle or when there is no demand for torque and starts the same automatically when a respective need is detected from the driver.

A positioning of the crankshaft for a starting process can be achieved when a means for precisely determining the rotational angle position of the electrical machine is provided, when a synchronization is performed between engine speed sensor and the means for precise determination of the rotational angle position of the electrical machine when the clutch is closed and at a crankshaft speed above a predetermined minimum speed, with the rotational angle position being adjusted to the engine speed sensor, and assuming the start rotating position is checked and controlled by means of the means for determining the rotating angle position of the electrical machine after the synchronization process.

Means for the precise determination of the rotational position are sometimes used as a standard in electrical machines. They can be formed by separate position sensors or also by sensor-free methods for determining the rotational angle position of the electrical machine.

In the method in accordance with the invention, the means for the precise determination of the rotational position of the electrical machine is used in order to determine the precise rotational crankshaft position during the cut-off phase of the internal combustion engine and to monitor the same during the start preparation phase. A further additional precision position sensor is thus not required.

It can be provided that the crankshaft is driven for assuming the start position by the electrical machine or that the crankshaft is braked for assuming the start position, preferably by the electrical machine.

In order to avoid rattling of the transmission when the internal combustion engine is idling, it can be provided that depending on the state in the transfer box, i.e. tensile or axial loading, the torque in the drive train is controlled by interaction of the switchable clutch in such a way that drive oscillations are suppressed, with the clutch preferably being driven with a clutch torque which is lower than the torque peaks of the drive torque of the internal combustion engine which fluctuates in a cyclic manner. It is especially possible that the clutch capacitance is guided slightly above the medium torque of the electrical machine.

The reversal of torque occurs mainly through compression processes, leading to braking of the crankshaft which the electrical machine is unable to follow as a result of inertia and low generational torque.

If the capacitance of the clutch is moved slightly above the generational torque of the electrical machine, the clutch will begin to slip in the case of a braking of the crankshaft due to a compression cycle and maximally transmit the clutch capacitance, albeit in a negative direction. In the subsequent combustion jolt, the clutch will also slip in the occurrence of torques larger than the clutch capacitance. The presented method cannot prevent the relaxation of the tooth stages between internal combustion engine and the electrical machine. As a result of the small difference between the maximum positive and maximum negative torques, the impacts in the meeting of the tooth flanks are effectively dampened and thus rattling of the transmission is effectively prevented.

A further improvement is obtained when the clutch capacitance is reduced during the compression processes, which is ideally up to the value zero because in this way the mentioned difference between the maximum positive and maximum negative torque values is reduced further.

The invention is now explained in greater detail by reference to the enclosed drawings.

DETAILED DESCRIPTION OF THE INVENTION

Figure 1:
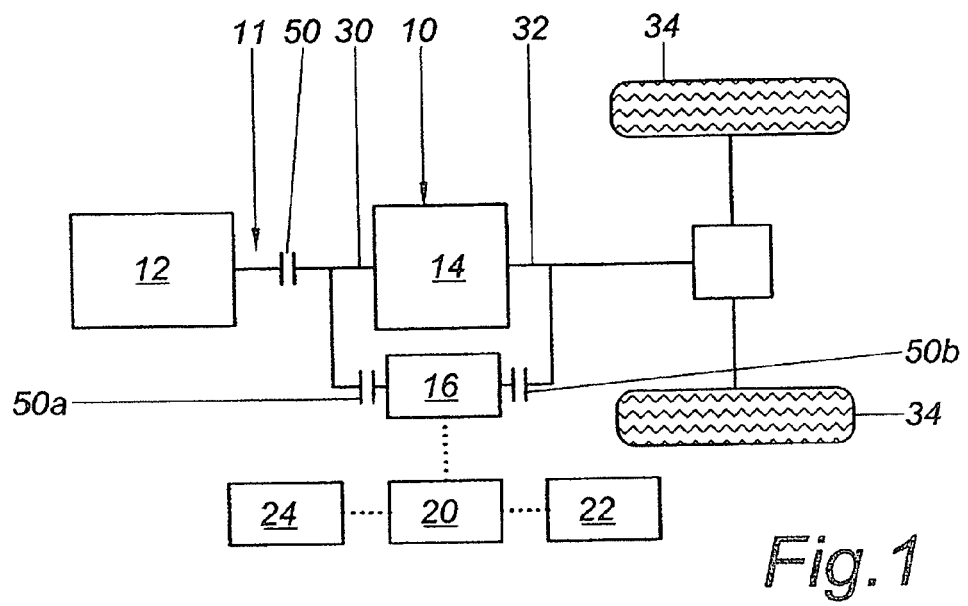
FIG. 1 schematically shows a drive train in accordance with the invention.
Figure 2:
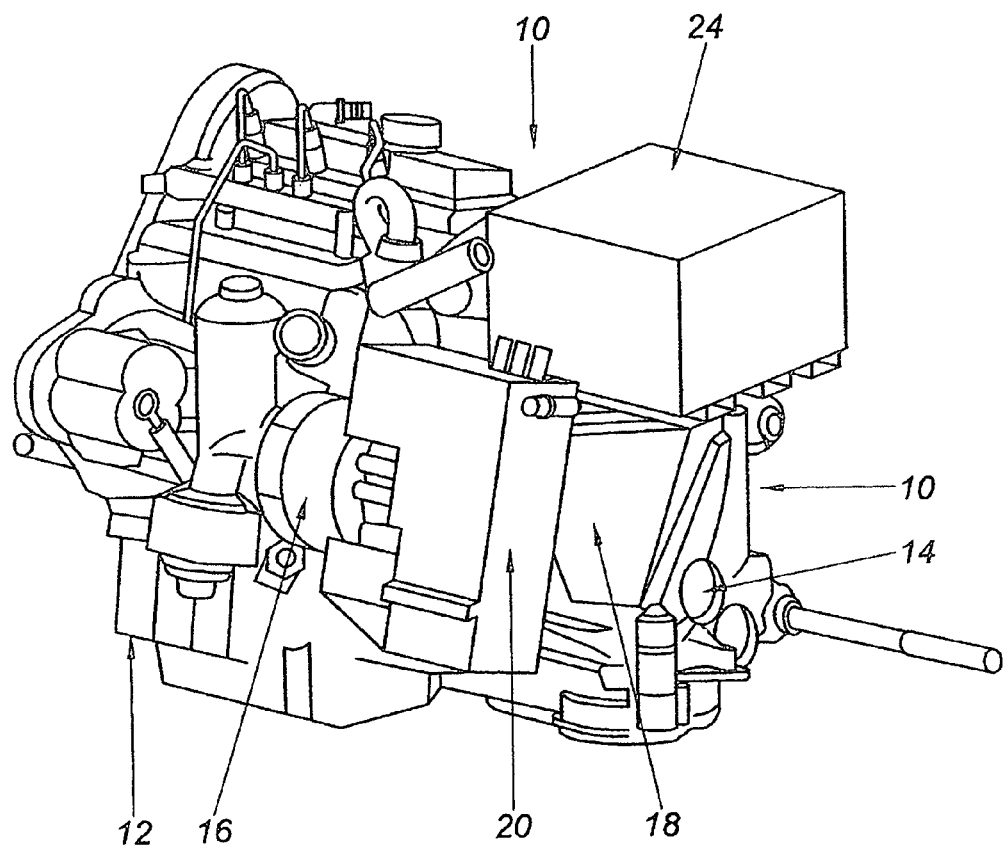
FIG. 2 shows a drive unit in an oblique view.

In order to meet the predetermined goals concerning minimization of consumption and emissions and concerning comfort and drivability which partly contradict each other, it is necessary to have a systemic approach by including the entire drive train. FIGS. 1 and 2 show such a hybrid drive train for a small-size and mid-size car with which the mentioned goals can be achieved. FIG. 1 shows the overall configuration of the hybrid drive system 10. The main drive source in the drive train 11 is formed by an internal combustion engine 12 (e.g. a diesel engine) which is smaller as compared with basic motorization and which is coupled via an automatically actuatable clutch 50 with an automatic transmission 14 with six gears for example. An electrical machine 16 is connected with the automatic transmission 14 via a transfer box 18 by means of switchable clutches 50a, 50b, e.g. switchable synchronous clutches for example. The electrical machine 16 which can be operated both as a generator as well as an engine has permanent power of approximately 10 kW and a peak power of approximately 25 kW for 5 seconds in the embodiment and is triggered via power electronics through 12 volts of battery voltage 22 and via a double-layer capacitor 24 with 42 volts. The transfer box 18 can couple via a switch the electrical machine 16 on the one hand with the drive shaft 30 and on the other hand with the output shaft 32 of the automatic transmission 14. The output shaft 32 leads to the drive wheels 34. As compared to an arrangement of the electrical machine 16 on the crankshaft of the internal combustion engine 12, the present hybrid drive system 10 comes with the advantage that the overall length of the automatic transmission 14 does not require enlargement in the clutch area, which is especially important for applications with engines installed transversally at the front. The electrical machine 16 with hybrid drive train 10 is a separate, inherently optimizable unit which is independent of the automatic transmission 14. In the case of systems which are situated on the crankshaft, the optimization of the air gap between stator (which sits on the transmission housing) and the rotor (which sits on the crankshaft) is especially difficult in the case of asynchronous machines, which sometimes leads to losses in efficiency.

The power electronics 20 which consists of processor 26, converter 28 and DC-to-DC converter (see FIG. 4) is screwed onto the transfer box 18. The double-layer capacitor 24 which is used as an energy store is situated above the automatic transmission 14 and is fastened to the car body (see FIG. 2). The cooling of the power electronics 20 and the electrical machine 16 is directly integrated in the cooling circulation of the internal combustion engine 12.

The electrical machine 16 can act both as a starter as well as a generator, as a result of which these two components can be omitted. In addition, braking power can be reclaimed (recouped) with the electrical machine 16, with the internal combustion engine 12 being coupled with its friction power, which in the case of systems on the crankshaft side could only be achieved with a second clutch.

A further important aspect of the hybrid drive system 10 is that the electrical machine 16 can fill up the interruption of tractive force during the shifting of the transmission, making the shifting of the automatic transmission 14 very convenient. This leads to a shifting comfort which comes close to that of automatic converter transmissions.

The choice of a double-layer capacitor 24 instead of a 42V battery allows operating the electrical motor 16 both as a motor and a generator with very high currents for a short period of time. This offers advantages both during the boosting and support in pull during the shifting as well as in recuperation. The stored quantity of energy of the double-layer capacitor 24 is lower in comparison with a battery, so that electrical functions are preferred which do not require any longer motor operation of the electrical machine 16. The strategy of energy management is accordingly designed to provide as many short loading and unloading cycles of the double-layer capacitor 24 as possible, for which purpose the same is well suited.

Figure 4:
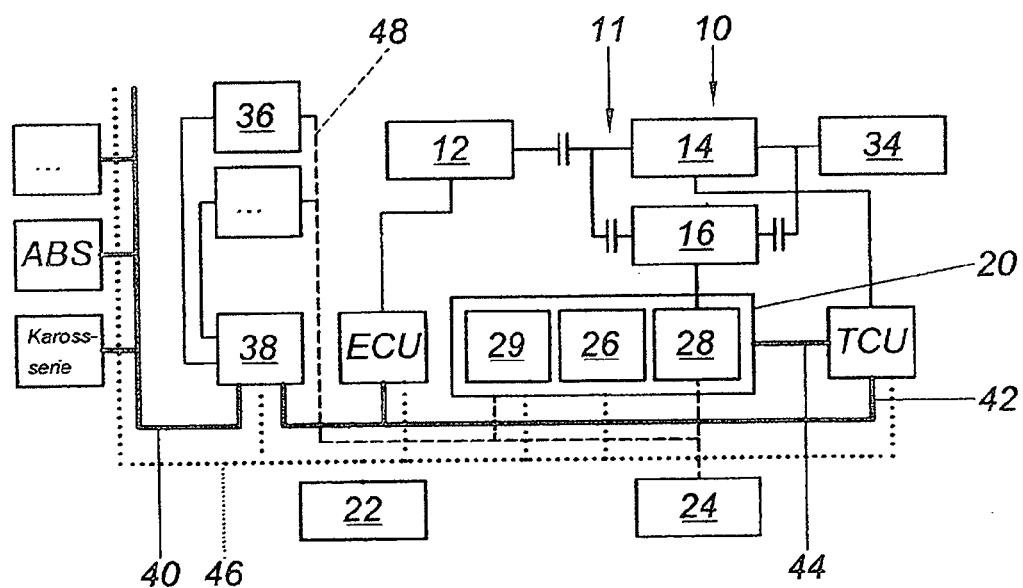
FIG. 4 shows the electrical system of the drive unit.

The structure of the electrical system is shown in FIG. 4. In addition to the electrical machine 16, the electric water pump 36 is supplied with 42V voltage. The supply of further electrical components (air-conditioning compressor, variable valve adjustment, etc.) is possible. The control unit connection to the control network of the vehicle is made via the control unit connection 38 which guides the necessary messages and instructions on the control network 42 of the hybrid-internal drive train which is connected with the engine control unit ECU and the transmission control unit TCU. The communication with the power electronics 20 which consists of the processor 26, the converter 28 and the DC-to-DC converter 29 occurs via a so-called private CAN (Control Area Network) which is indicated with reference numeral 44. The control network 40 of the vehicle and the control network 42 of the drive train can be arranged as a CAN bus system.

In the present case, the internal combustion engine 12 is arranged as a three-cylinder diesel engine with two valves per cylinder and cross-flow cylinder head concept and a variable swirling system. The internal combustion engine 12 comprises a piezo common rail injection system, an exhaust gas recirculation system with cooler and electrical exhaust gas recirculation valve, an electric water pump and an electric thermostat valve. A variable turbine geometry is provided as a charging concept.

Reference numeral 46 designates the 12V network in FIG. 4 and reference numeral 48 designates the 42V network.

Considerably higher engine loads in the illustrated driving cycle (e.g. NEDC—New European Driving Cycle) with respectively improved thermodynamic efficiencies of the internal combustion engine 12 can be achieved by means of load displacement by volumetric adjustment and by the automatic transmission 14. However, the resulting higher loads lead to more difficult boundary conditions concerning $NO_x$ emissions. $NO_x$ emissions can be reduced substantially however by optimizing the combustion-relevant parameters such as piston trough, compression, nozzle specification, nozzle projection length, AGR rates, charge movement (swirl) as well as injection pressure and injection start under the boundary condition of respectively high specific engine load.

Figure 3:
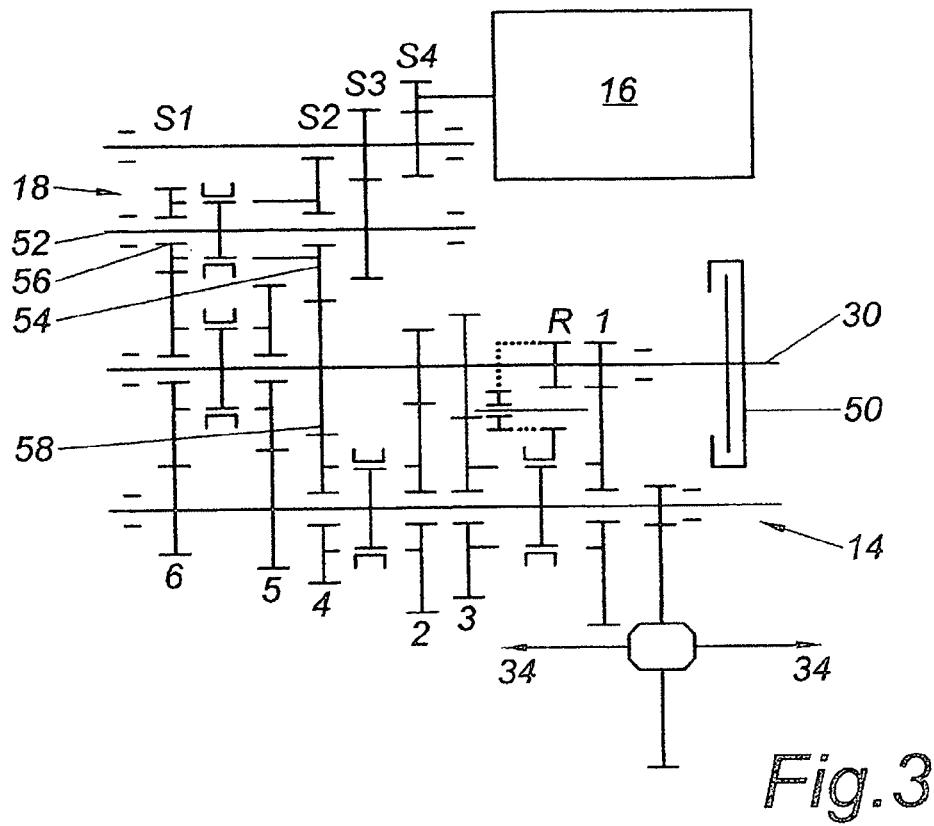
FIG. 3 shows a schematic view of the wheel set of the transmission.

FIG. 3 shows the schematic arrangement of the automatic transmission 14 and the transfer box 18. The forward gears 1 to 6 are synchronized, the reverse gear R is arranged as a sliding gear.

The clutch 50 is actuated through an electromotively driven clutch actuator by a release lever. The shifting of the transmission also occurs in an electromotive manner. Two gear-selector drums are each actuated via two gear stages and the gears are thus engaged and disengaged. The one gear-selector drum is associated with the gears of reverse, 2, 4 and the other with the gears 1, 3, 5 and 6. This shifting concept ensures very short transmission shifting times. Since adjacent gears lie on different gear-selector drums, very short transmission shifting times can be achieved by simultaneous disengagement of the start gear and engagement of the target gear, which was previously only possible with hydraulic actuation. Double shifting (e.g. 5 to 3) can occur very quickly because it is not necessary to engage an intermediate gear.

The coupling of the electrical machine 16 with the automatic transmission 14 occurs by the transfer box 18. The power flow moves from the electrical machine 16 via two cylinder gear steps (step S4 and S3) onto the intermediate shaft 52 on which are located the change gears 54, 56 of step S2 and the step S1. These two change gears 54, 56 can be switched by the gear-selector drum of the gears R/2/4, so that no further actuator system is required for this purpose. The step S2 connects the electric motor 16 via the fixed gear 58 of the $4^{th}$ gear with the drive shaft 30. The internal combustion engine 12 can be started in this shifting position for example. Step S1 connects the electrical machine 16 with the output shaft 31, as a result of which boosting, i.e. driving of short output peaks, is enabled. Since the electrical machine 16 can revolve with up to 20,000 $min^{-1}$ for example, special emphasis must be placed on the configuration of the gearings, especially step S4, and the construction of the bearings and the housing.

Figure 5:
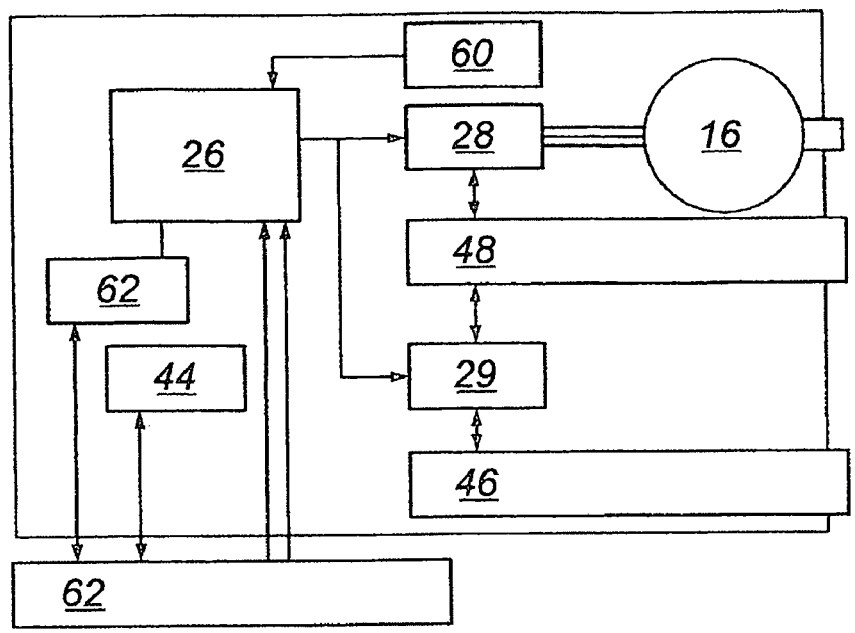
FIG. 5 shows a schematic view of the electric drive.

The electrical machine 16 and the power electronics 20 are attached in the present example to the transfer box 18, with the power electronics 20 containing in a housing the processor 26, the DC-to-DC converter 29 and the converter 28. This leads to a very compact arrangement and to very short paths for guiding the current and for the cooling lines between electrical motor 16 and the power electronics 20 on the one hand, and to short paths between the adjacent components of double-layer capacitor 24 and the engine cooler. The configuration of the electrical system with the interfaces is shown in FIG. 5.

A sturdy asynchronous machine for example is suitable for meeting the requirements placed on the electrical machine 16. The frequency converter 28 which is especially critical concerning cooling is integrated via a bypass directly into the cooling circulation of the internal combustion engine 12. The coolant is guided to the thermally more uncritical electrical machine 16 only after this. Cooling and compact configuration are thus important requirements placed on the converter 28. The DC-to-DC converter 29 is used for coupling the 42V onboard network 48 with the 12V onboard supply network 46. It assumes primarily the task of the electric generator. A simple topology can be implemented as a result of the compact arrangement. Since in current vehicle concepts there is generally no 42V network, the present concept provides a simple possibility of expanding existing families of vehicles by a bus with higher voltage for consumers with a high need for power. The 42V network 48 can also be limited locally to the area of the electrical machine 16. It is then merely used for coupling the converter 28 with the energy store. The linkage of the sensor system 60 and the diagnostic interface 62 (e.g. RS-232) complement the diagram of the electric drive. Diagnostic interface 62 and private CAN 44 can be connected via vehicle plug-in connectors 63 or terminals 15/30/CAN.

In contrast to conventional drive trains, the integration of the electrical machine 16 in the described hybrid drive system 10 offers the following additional functions:

Quiet, rapid and emission-reduced starting of the internal combustion engine 12,
Generator operation for supplying the 12V and 42V onboard network,
Recuperation (on braking energy recuperation by electric braking or internal combustion engine thrust simulation),
Cut-off during idling (start-stop function) with quiet rapid starting of engine,
Shifting with tractive force support, Electric start-up support,
Boosting,
Impulse start.

The topology principally allows electric driving and creeping. These functions are also limited by the energy store however.

The cut-off of the internal combustion engine 12 during a longer standstill of the vehicle (e.g. before traffic lights) and with actuated foot brake offers decisive advantages in consumption in the driving cycle. Decisive for the acceptance of this function of cut-off during idling is the short reaction time on renewed starting of the internal combustion engine 12. This means that between the detachment of the brake and the actuation of the gas pedal it is necessary for the internal combustion engine to start, so that the vehicle will start to move without any delays as is usually the case. The renewed starting is initiated by a drop in the brake pressure or a minimum movement on releasing the brake pedal, whereupon the electrical machine 16 accelerates the internal combustion engine 12. The start gear is then engaged and the positive engagement to the drive wheels is produced.

The use of an automatic transmission 14 in the present hybrid drive system 10 with very good efficiency also contributes to a reduction in consumption in the driving cycle in automatic mode by the free choice of the shift points. At the same time, driver is given a sporty convenient possibility to change the gears by the manual mode. The only disadvantage of this transmission configuration in comparison with automatic converter transmissions is the short interruption of tractive force. The present hybrid drive system 10 now offers the possibility to drive the vehicle via the electrical machine 16 during the said short interruption of tractive force and thus to perform highly convenient shifting. When shifting gears up under full load, the tractive force support is between 30% and 100% depending on gear and engine speed. This means that the tractive force during the shifting is up to 100% of the tractive force after the shifting. Especially in the case of gear shifting from 1 to 2 and 2 to 3 which is critical with respect to shifting comfort in automatic transmissions, the tractive force support is higher than 50% over the entire speed range of the internal combustion engine.

Figure 6:
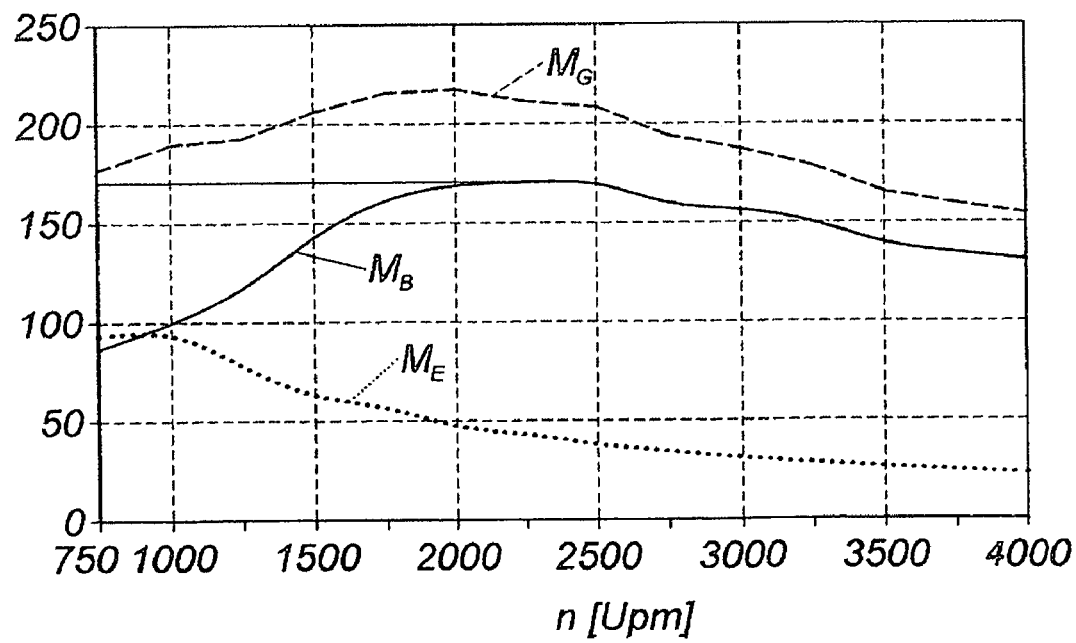
FIG. 6 shows a torque characteristic of the drive train in the $5^{th}$ gear.

It is the target of the boosting function to improve the dynamics and agility of the vehicle. FIG. 6 shows the torque characteristics of the internal combustion engine 12, the electrical machine 16 and the achievable total torque $M_G$. The torque of the internal combustion engine 12 is $M_B$, the torque of the electrical machine 16 is shown with $M_E$. The torque M is shown over the speed n.

Moving away and accelerating in the first gear is especially important for the agility of the drive, which also applies to spontaneity, especially in higher gears. FIG. 6 shows in an exemplary way the curve of the torque $M_E$ of the motively driven electrical machine 16 (permanent operation) in addition to the torque characteristics $M_B$ of the internal combustion engine 12 as well as achievable total torque $M_G$ for the case of the electrical machine 16 on the output shaft 32 at shifted gear 5. As is shown, a total torque $M_G$ which corresponds to the maximum moment of the internal combustion engine 12 can be provided in this case already at idling speed. By briefly overloading the electrical machine 16 it is possible to illustrate this characteristic for all gears. Since it is not possible to boost for any random period of time as a result of the system, it is necessary to provide a limitation to the most efficient range. When the driver requires a respective output via the accelerator pedal, the boosting function is available from starting up to the speed of the maximum engine torque (in the embodiment close to 2000 min$^{-1}$). In order to avoid overloading the transmission, the total torque $M_G$ from the internal combustion engine 12 and the electromotor 16 can be limited to the maximum moment $M_B$ of the internal combustion engine 12. This offers the vehicle the dynamics in the operating range characterized by the so-called "turbo hole" and thus contributes especially to acceptance and driving fun. Since these speed ranges (especially in the lower gears) are passed very quickly, the power required for this purpose from the double-layer capacitor 24 remains within limits.

The boosting function also contributes to consuming the recouped power again, which shall be explained below in closer detail:

The total expenditure of energy of the vehicle with the hybrid drive system 10 is approximately 4.3 MJ in the embodiment for an examined NEDC driving cycle. Approximately 1.3 MJ are lost during braking. This represents the theoretical potential for braking energy recuperation and energy savings for the entire cycle. It is the object of intelligent energy management to utilize as much as possible of these braking losses by recuperative braking and to make the same available again in a useful manner for the operation of the vehicle. By considering the boundary conditions of "maximum output of the electrical machine" and "maximum voltage excursion of the energy store" it is possible to gain approximately 410 kJ during the NEDC driving cycle. This value also considers the usability of the energy management in real driving operation. The loading and unloading cycles of the energy store are precisely predeterminable In the NEDC driving cycle. One can thus accept a very low energy level for a longer period of time when a loading cycle is expected as the next event. This knowledge is missing in real driving operations. That is why one must ensure that the store always holds a minimum energy reserve and that sufficient reserves are available at all times for shifting with tractive force support for example. This means a reduction of the maximum voltage excursion and thus also a reduction of the potential for recuperation in the NEDC driving cycle to approximately 410 kJ.

To ensure that the energy content of the store is identical before and after the NEDC driving cycle, the recouped energy needs to be consumed during the cycle. When considering the entire efficiency chain, it does not make sense to operate the electrical machine 16 simply parallel to the internal combustion engine 12. The analysis of the NEDC driving cycle shows transient high-loading points however which substantially contribute both to the $CO_2$ as well as $NO_X$ result. It is therefore the chosen strategy to support the internal combustion engine 12 with the electrical machine 16 in those ranges specifically (boosting).

Figure 7:
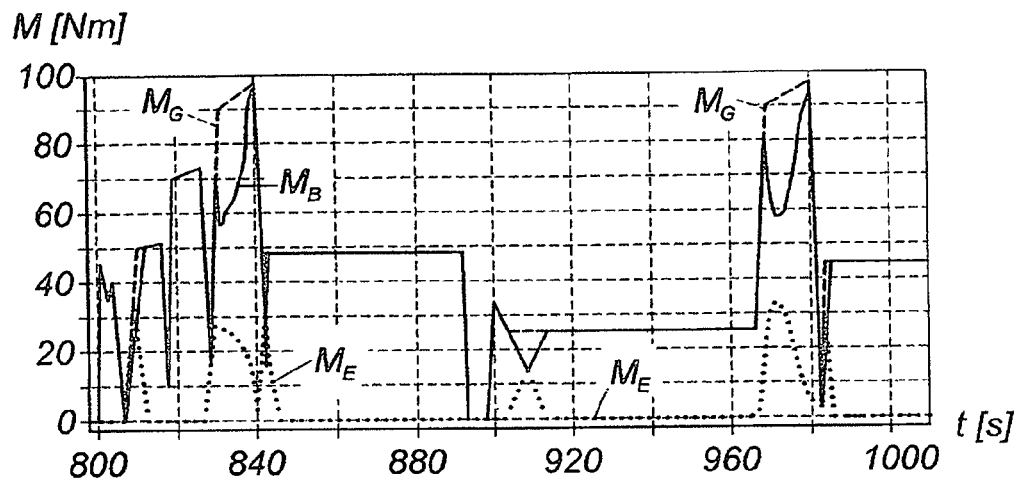
FIG. 7 shows the torque distribution in the drive train.
Figure 8:
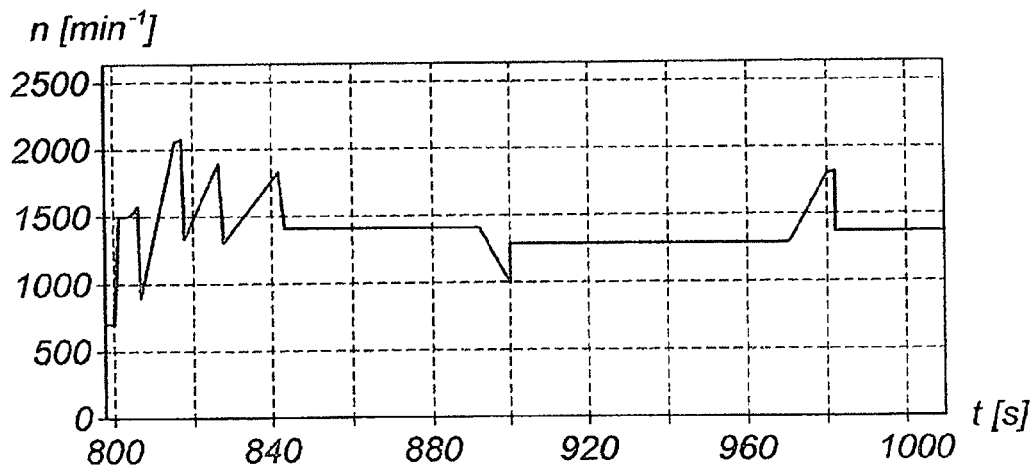
FIG. 8 shows the speed of the internal combustion engine in a driving cycle outside of a city.

FIG. 7 shows the summation of the torques $M_B$, $M_E$ of the internal combustion engine 12 and the electrical machine 16 in a section of the NEDC driving cycle. Tractive force support was omitted during the shifting for the purpose of better clarity of the illustration. FIG. 8 shows the respective curve of the speed n of the internal combustion engine 12.

Figure 9:
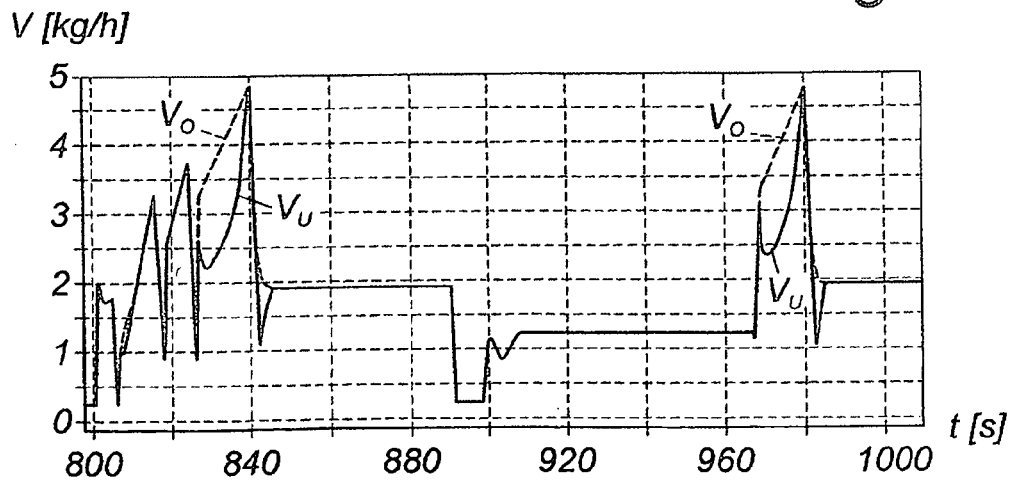
FIG. 9 shows the consumption of the drive train in a driving cycle outside of the city.
Figure 10:
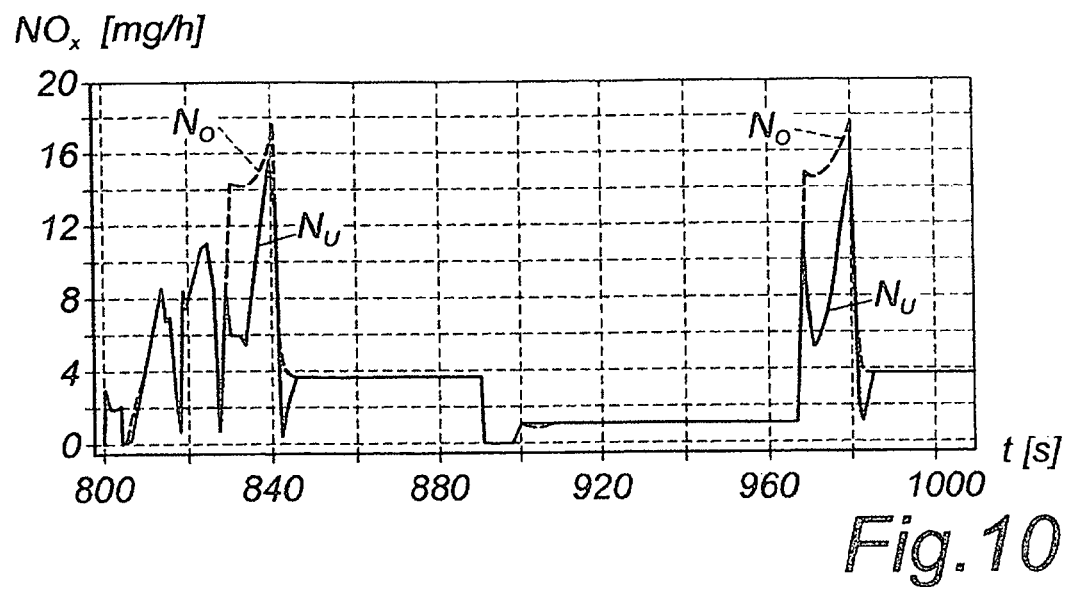
FIG. 10 shows the $NO_x$ emissions of the drive train in a driving cycle outside of the city.

FIGS. 9 and 10 show the saving potentials for $CO_2$ and $NO_X$ emissions. The energy input for the support of the electromotor 16 is 393 kJ, as a result of which the energy stores are nearly fully balanced before and after the driving cycle. The presented strategy allows a reduction of the $NO_X$ emissions by approximately 15% as well as a $CO_2$ reduction by approximately 9%. The curves $V_o$ and $N_o$ show consumption and $NO_X$ emissions without support with the electrical machine 16, and the curves $V_u$ and $N_u$ show the consumption V and $NO_X$ emissions with support with the electrical machine 16.

Figure 11:
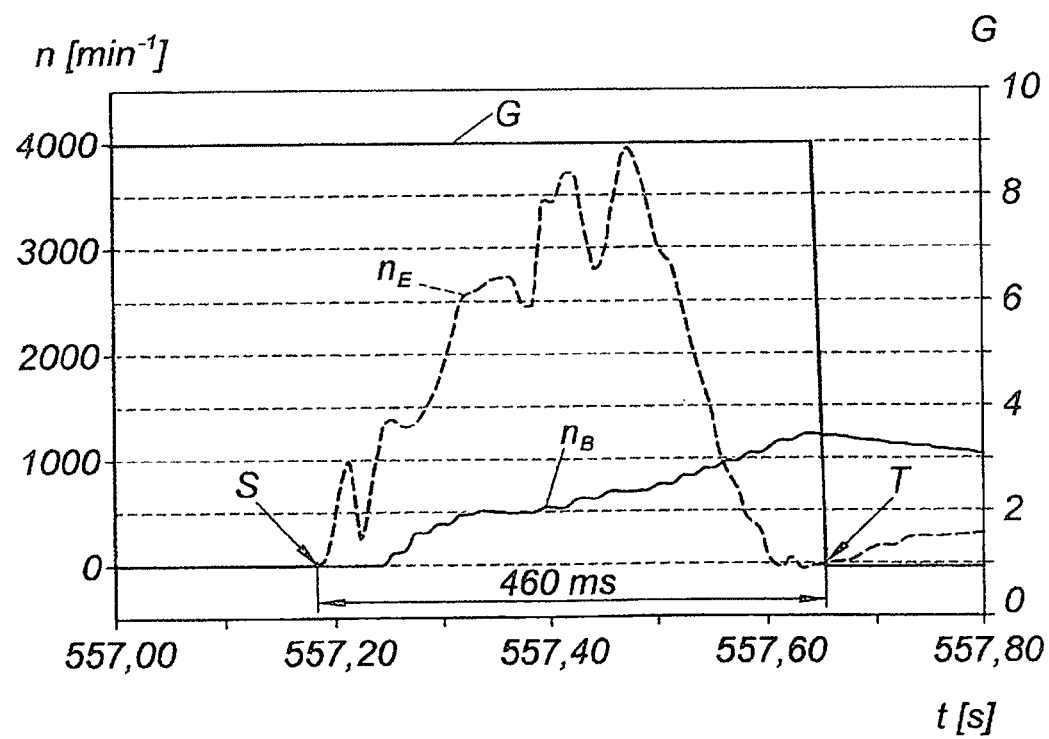
FIG. 11 shows the speeds of the drive train during a quick start of the engine.

The rapid start of the engine starts with the described brake pedal movement which initiates the start command for the renewed start of the internal combustion engine 12. At virtually the same time, the torque build-up of the electrical machine 16 starts, as a result of which the internal combustion engine is accelerated. Driving readiness is given as soon as the first gear has been engaged and driving away is possible with the electrical machine 16. FIG. 11 shows the rapid start of the internal combustion engine 12 during a start-stop function, with the speed $n_E$ of the electrical machine 16 and speed $n_B$ of the internal combustion engine 12 being entered over the time t. The start command occurs at point S. The first gear is engaged at point T and the transmission of torque onto the wheels is possible. Line G shows the gear step, with gear step "9" symbolizing the neutral step in this case.

Figure 12:
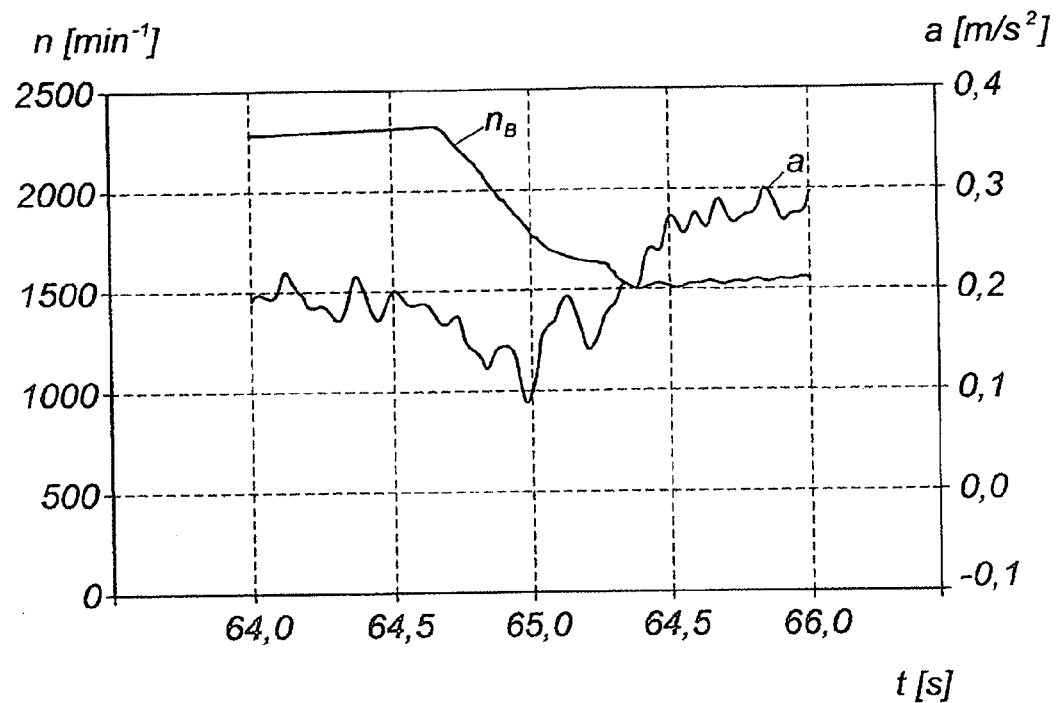
FIG. 12 shows the speed of the internal combustion engine and the longitudinal acceleration of the vehicle with electromotive support.
Figure 13:
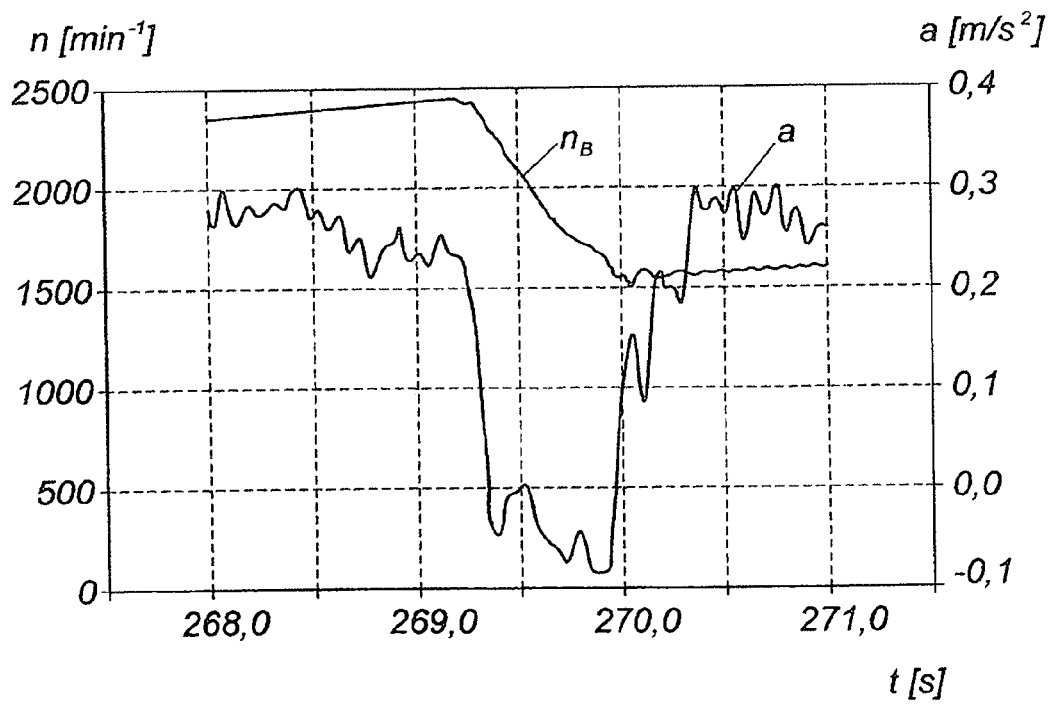
FIG. 13 shows the speed of the internal combustion engine and the longitudinal acceleration of the vehicle without electromotive support.
Figure 14:
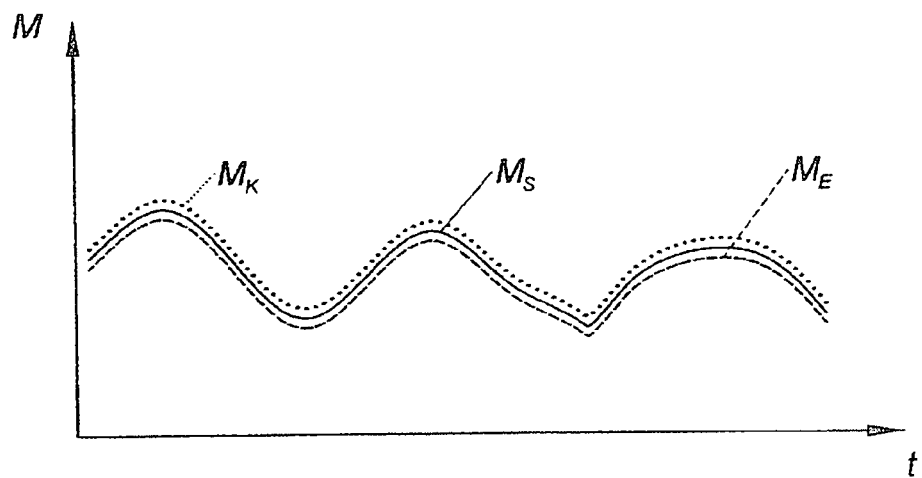
FIG. 14 shows a torque diagram which explains a first embodiment of the invention.
Figure 15:
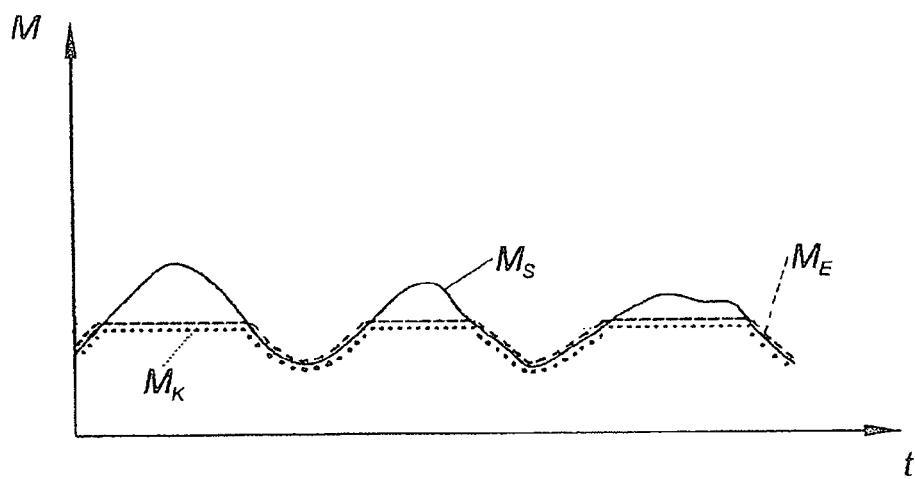
FIG. 15 shows a torque diagram which explains a second embodiment of the invention.

FIG. 12 shows the curve of engine speed $n_B$ of and the vehicle acceleration a (calculated from the measured wheel speed on the roller test stand) with support of the electrical machine 16. FIG. 13 shows the curve of the engine speed $n_B$ and the vehicle acceleration a without the support of electrical machine 16. Without electromotive support, the typical interruption of the tractive force occurs during shifting (acceleration a becomes negative). With the help of the electrical machine 16 it is possible to provide a continuously positive torque and to partly refill the interruption in the tractive force.

In order to save fuel, the internal combustion engine can be cut off in certain vehicle states. When the vehicle state changes, the internal combustion engine starts again, which must also be possible in a moved vehicle. An impulse of the electrical machine 16 which is arranged as a starter generator can be used in the hybrid drive system 10 for accelerating the internal combustion engine 12 and an impulse for the drive wheels 34. A device in the transmission 14 is necessary for coupling the electrical machine 16 to the transmission input, which device can only be used up to a defined, relatively low vehicle speed (first gear step). The start of the internal combustion engine 12 directly via the electrical machine 16 can thus not be generally guaranteed in a moved vehicle. The start via the impulse of the drive wheels 34 will work in the entire speed range of the vehicle when the electrical machine 16 is coupled to the transmission output. A reaction torque will be produced in this case however which will be noticed by the vehicle passengers in the form of a disturbing jolt.

This reaction torque can be compensated or weakened by using the electrical machine 16 within the scope of its efficiency.
1) The electrical machine 16 is operated precisely with the drag torque $M_S$ of the internal combustion engine 12. The clutch capacitance $M_K$ of the clutch 50 is thus carried along with precisely the torque $M_E$ of the motively driven electrical machine 16. If sudden jolts occur which are too fast or too high in order to adjust the torque $M_E$ of the electrical machine 16, then this will lead to a slippage of the clutch 50, as a result of which the jolts are buffered. This method is suitable when the drag torque $M_S$ of the internal combustion engine 12 can be compensated completely by the electrical machine 16.
2) If the electrical machine 16 is unable to compensate the full drag torque $M_S$ of the internal combustion engine 12, it will be operated with a torque $M_E$ which corresponds to the mean drag torque $M_m$. Said torque $M_E$ must be large enough in order to ensure no permanent slippage of the clutch 50. The clutch 50 is operated with a capacitance $M_K$ which also corresponds to said mean drag torque $M_m$. If jolts occur by the cylinder compression for example which are larger than the clutch capacitance $M_K$, then this will lead to a slippage of the clutch 50 and to a buffering of the jolts. If torques occur which are smaller than the mean drag torque $M_m$, the torque of the electrical machine 16 will be reduced accordingly.

In the start of the internal combustion engine 12 in the hybrid drive system 10, the power transmission occurs via the clutch 50 between the electrical machine 16 and the internal combustion engine 12. According to the state of the art, the acceleration of the internal combustion engine 12 would be performed until reaching the target speed with closed clutch 50. This procedure allows a secure start, but it requires a rather large amount of time.

This time can be reduced by starting to open the clutch 50 even while a torque is being transmitted by the electrical machine 16 and by continuing the acceleration of the internal combustion engine 12 with a successively increasingly slipping clutch 50. The drag torque of the internal combustion engine 12 depends on the position of the crankshaft. In order to enable the transmission of the torque as long as possible on the one hand and to open the clutch 50 rapidly on the other hand, the start of the clutching process is moved to an upper dead center of the internal combustion engine 12. The determination of the opening torque can thus occur in two ways:
1) By using a means designated as encoder for the precise determination of the position of the rotational angle of the electrical machine 16, its absolute angle can be read out at all times. This encoder can be used to draw conclusions on the position of the internal combustion engine 12 when at an earlier time an alignment was made between the position sensor of the internal combustion engine 12 and the encoder of the electrical machine 16. This alignment between the position sensor of the internal combustion engine 12 and the encoder of the electrical machine 16 is made in such a way that when the clutch 50 is closed and in the case of a crankshaft speed above a predetermined minimum speed a synchronization is performed between the position sensor of the internal combustion engine 12 and the encoder of the electrical machine 16, with the latter being adjusted to the position sensor.
2) When the torque $M_E$ of the electrical machine 16 follows up the drag torque $M_S$ of the internal combustion engine 12, it is possible to derive the upper dead center positions of the pistons from the torque curve $M_E$ of the electrical machine 16.

Figure 16:
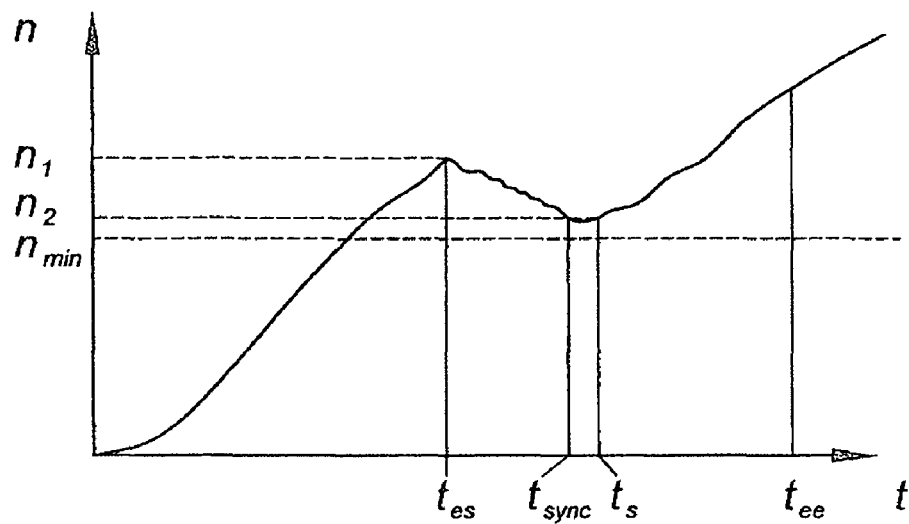
FIG. 16 shows a diagram which explains a third embodiment of the method in accordance with the invention.

The diagram of FIG. 16 shows the engine speed n over time t. At time t=0 the internal combustion engine is at a standstill and it is assumed that the signal for starting the internal combustion engine and for driving away is given once a respective desire by the driver is detected, expressed for example in such a way that the accelerator pedal is pressed down. The speed n of the internal combustion engine 101 increases following the start of the starter. Once a predetermined speed $n_1$ is reached, the clutch 102 begins to engage and the transmission of the torque onto the drive wheels 104 begins. A driving torque is transmitted from the internal combustion engine 101 onto the wheels 102 via the slipping clutch 102. The speed n of the internal combustion engine 101 finally decreases by the torque transmission to a value $n_2$, but is held by a suitable device in the control of the drive train at the level chosen for the start-up phase. This value $n_2$ will always lie over the minimum speed $n_{min}$, and generally also over the idling speed. It is ensured through the predictability of the system behavior that the value will not fall below the minimum speed $n_{min}$.

The first injection starts at the time $t_s$, which lies shortly after the time $t_{sync}$, and the internal combustion engine 101 thus starts to supply a positive torque. The engagement process of the clutch 102 is completed at time $t_{ee}$, which lies after the time $t_{sync}$, and a direct power transmission is produced.

Figure 17:
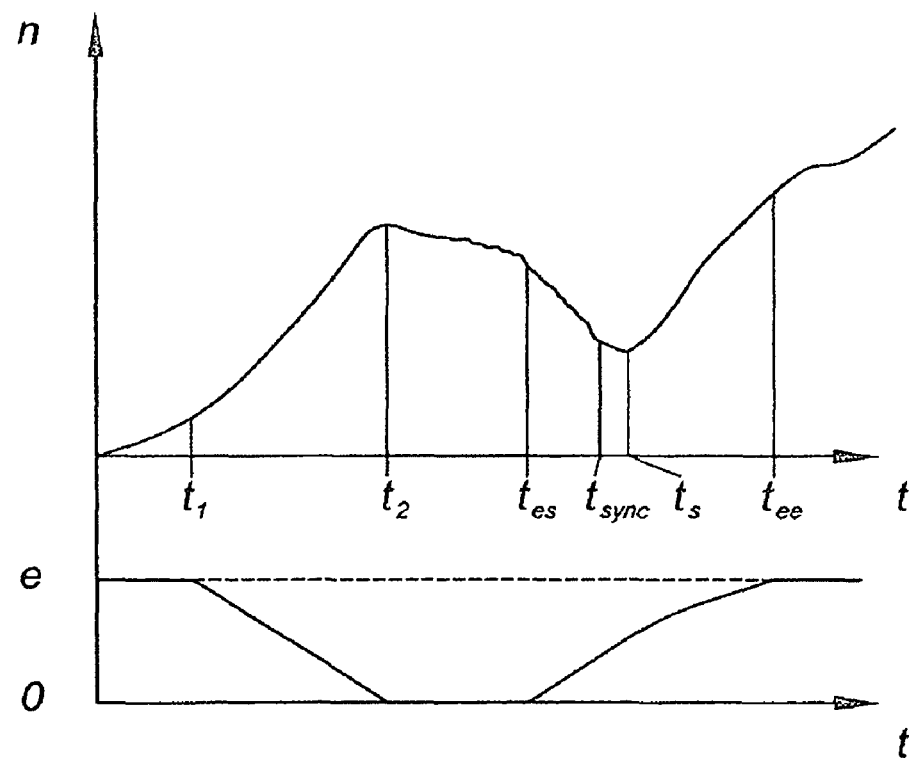
FIG. 17 shows a diagram which explains a fourth embodiment of the invention.

The embodiment of the method of FIG. 17 differs from that of FIG. 16 in such a way that the clutch is initially engaged up to time $t_1$. The transmission is in the idle position, so that there is no power transmission. The clutch is opened between times $t_1$ and $t_2$, so that a control command can be given to the automatic transmission to engage the first gear. From time $t_{es}$ the method proceeds in a manner analogue to that of FIG. 16.

Beneath the t-n diagram of FIG. 17 the illustration shows the progress of the clutch actuation, with o meaning the opened state and e meaning the engaged state.

Figure 18:
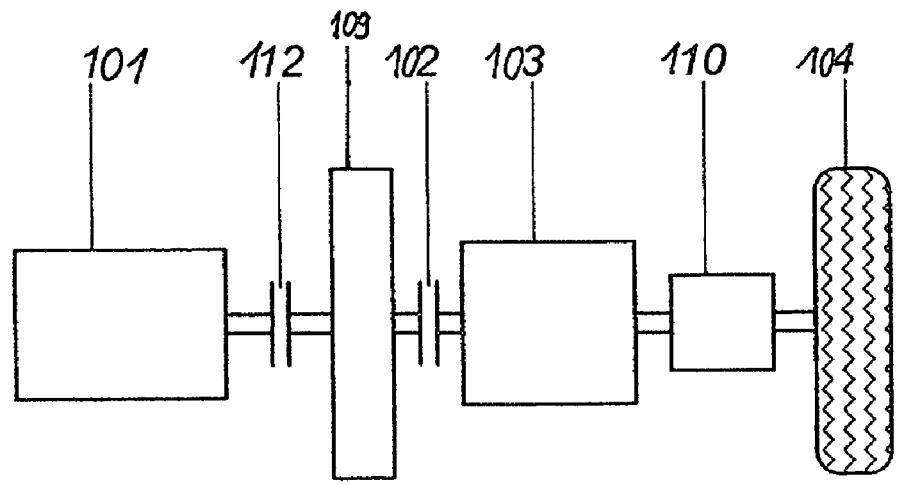
FIG. 18 schematically shows the essential components of the drive train of a motor vehicle in accordance with the invention in a fifth embodiment.

FIG. 18 schematically shows in a first embodiment the essential components of the drive train of a motor vehicle in accordance with the invention. An internal combustion engine 101 is in connection with an automatic transmission 103 via an automatically actuatable clutch 102. The transmission 103 drives the drive wheels schematically indicated here with 104 via a drive train which is indicated here with reference numeral 110. A crankshaft starter generator 109 is provided upstream of the clutch 102, which generator is used among other things for starting the internal combustion engine 101. A further clutch 112 is optionally provided between the internal combustion engine 101 and the crankshaft starter generator 109, allowing for a purely electrical operation of the vehicle. This embodiment realizes both the method according to FIG. 16 as well as the method according to FIG. 17.

Figure 19:
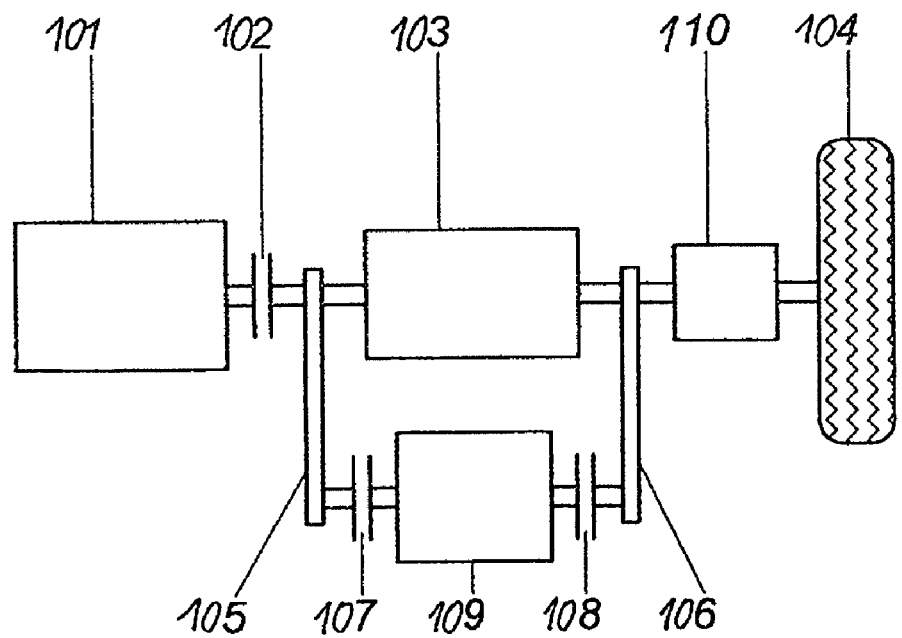
FIG. 19 shows a sixth embodiment of the drive train.

In the embodiment of FIG. 19, the starter generator 109 is arranged parallel to the transmission 103. A first belt drive 105 is arranged upstream of the transmission 103 and a second belt drive 106 downstream of the transmission 103. The belt drives 105 and 106 are in connection with the electrical machine 109 via clutches 107, 108, which electrical machine is used as a starter generator. In the case of a respective configuration of the transmission 103 it is possible to also arrange the clutches 107, 108 as synchronous rings or replace them by the same.

Since the clutch 102 is arranged upstream of the belt drive 105, only the method according to FIG. 17 can be realized with such an embodiment. By opening the clutch 102 at time $t_2$, the transmission of the torque from the starter generator 109 to the internal combustion engine is interrupted, so that the speed n begins to decrease after time $t_2$.

It is obvious to the person skilled in the art that by respective modifications it is also possible to perform a method according to FIG. 16 with a similar embodiment.

Figure 20:
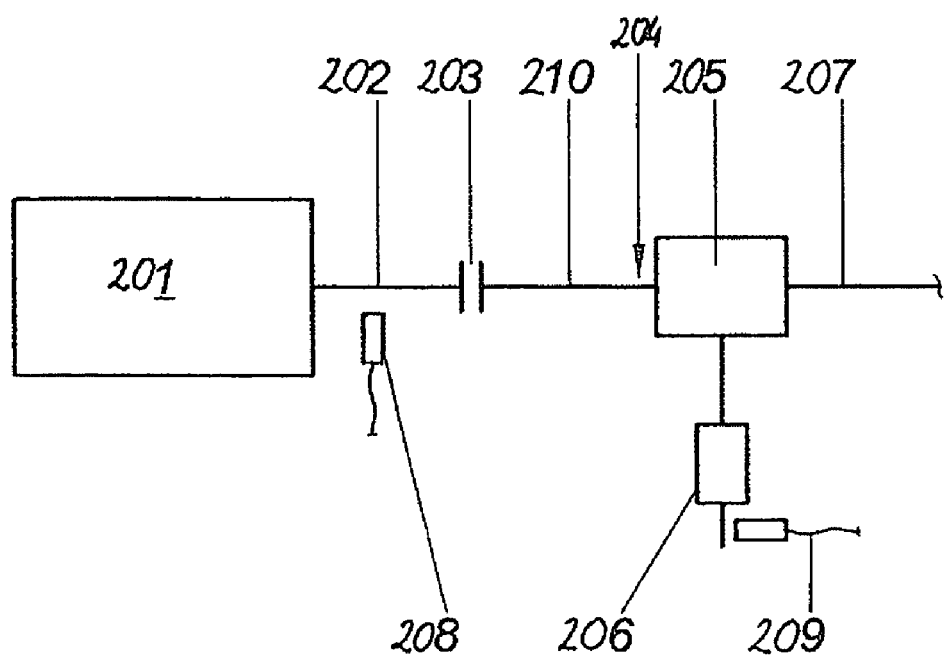
FIG. 20 shows a seventh embodiment of a drive train.

FIG. 20 shows an internal combustion engine 201 which is connected via a crankshaft 202 and a switchable clutch 203 to a drive train 204 in which a transmission 205 is arranged. An electrical machine 206 is operatively connected with the transmission 205, which electrical machine is optionally operatively connected with the transmission input shaft 210 or transmission output shaft 207. Such arrangements of internal combustion engine 201, clutch 203, transmission 205 and electrical machine 206 are frequently used in hybrid vehicles.

For the purpose of monitoring the speed of the crankshaft 202, a speed sensor 208 is provided for example in the area of a flywheel, which sensor is able to detect the rotational position of the crankshaft 202 only from a predetermined minimum speed of the crankshaft 202 of 100 rotations per minute for example.

A highly precise position sensor 209 or a sensor-free method is provided for detecting and monitoring the precise position of the rotational angle of the electrical machine 206. The position of the rotational angle can thus be determined with a precision of approximately 0.5° of crank angle. Such position sensors or sensor-free methods are used as a standard in electrical machines arranged as polyphase machines.

In order to enable a quick start after the cut-off of the internal combustion machine 201, the crankshaft 202 is brought to a predetermined start rotational position in a start preparation phase. Because the crankshaft 202 is brought to a precisely predefined start rotational position prior to the injection and the ignition of the fuel, a rapid synchronization of the electronic system of the engine is enabled on the one hand and an optimal start-up of the internal combustion engine on the other hand in order to overcome the first compression phase as quickly as possible. In order to realize this, it is provided for in accordance with the method in accordance with the invention that the position of the rotational angle of the crankshaft 202 is monitored via the position sensor 209 of the electric machine 206 or the sensor-free method for determining the position of the rotational angle. The precondition is however that the position sensor 209 or the sensor-free method are adjusted prior to this to the crankshaft position. This is performed with the speed sensor 208 which is used as a standard for measuring the crankshaft speed. It is checked in a first step whether the clutch 203 is closed. If not, this state is brought about and a rigid rotational connection is brought about between crankshaft 202 and drive train 204 and electrical machine 206, with simultaneous severing of the drive train from the drive wheels. It is further checked whether the speed of the crankshaft 202 lies above a minimum speed at which the speed sensor 208 can be used for determining the position. When these two preconditions are fulfilled (closed clutch 203 and speed of the crankshaft 202 over the minimum speed), the position sensor 209 or the sensor-free method is adjusted to the speed sensor 208 and thus a synchronization is performed. This process, which requires only a few fractions of a second up to seconds, can occur after the cut-off and during the coasting of the internal combustion engine 201.

In the start preparation phase which can be performed after the cut-off or only shortly before the start process, the crankshaft 202 is brought to the predefined start rotational position with help of the electrical machine 206 and the position sensor 209. This may occur by active driving of the crankshaft 202 by the electrical machine 206 or, especially after the cut-off of the internal combustion engine 201, by braking the crankshaft 202, especially with the help of the electrical machine 206, to the predefined start position.

A highly precise start preparation position of the crankshaft 202 and a very rapid starting process can thus be enabled without requiring additional precision position sensors.

Figure 21:
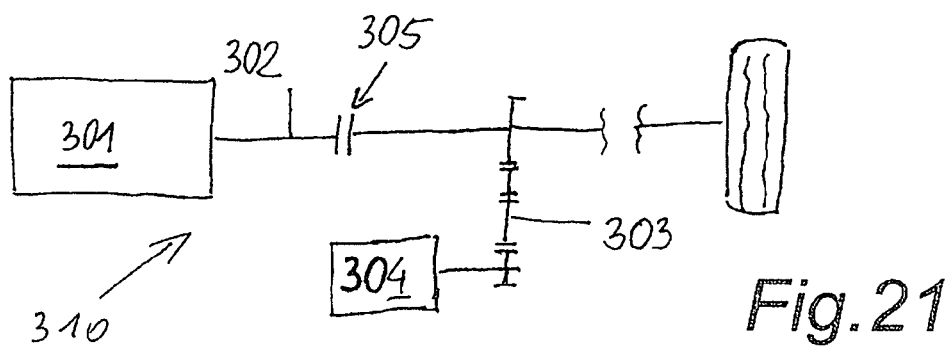
FIG. 21 shows a drive train in a further embodiment.

FIG. 21 shows a drive train 310 with an internal combustion engine 301 which acts upon a drive shaft 302. The drive shaft 302 is further connected via a transfer box 303 with an electrical machine 304 which is arranged as a side-mounted starter generator. A switchable clutch 305 is arranged between the internal combustion engine 301 and the transfer box 303. Rattling in the transfer box 303 may occur especially when the machine is idling, which is caused by compression and combustion jolts of the internal combustion engine 301.

Figure 22:
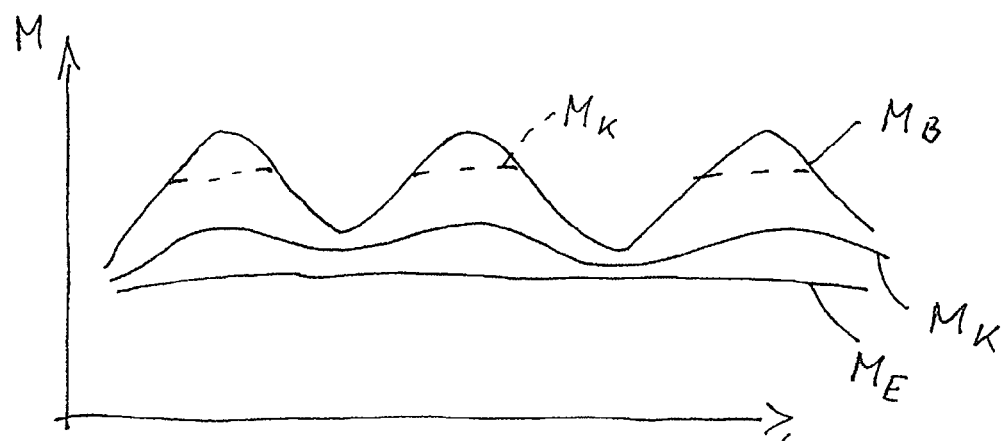
FIG. 22 shows torque-time diagram.

FIG. 22 shows a diagram in which the torque M is entered over time t. The drive torque $M_B$ of the internal combustion engine 301, the clutch capacitance $M_K$ and the mean torque $M_E$ of the electrical machine 304 are entered. The rattling of the transmission is caused by the compression and combustion jolts of the internal combustion engine 301. An improvement in the rattling of the transmission can be achieved by operating the clutch 305 in such a way that the torque peaks of the torque $M_B$ of the internal combustion engine 301 are cut off, as is indicated by the broken line. It is especially advantageous when the clutch capacitance $M_K$ is set so that it lies slightly above the mean moment $M_E$ of the electrical machine. The clutch torque $M_K$ can be smaller than that of the internal combustion engine $M_B$.

The invention claimed is:

1. A method for controlling the start-up phase of motor vehicles which are driven by an internal combustion engine and comprise an automatically actuated clutch, with the internal combustion engine being accelerated at first by a starter from standstill, with an engagement process of the clutch being startable from a predetermined threshold speed in order to initiate a start-up phase and with an injection process being started at a time after a synchronization time, wherein the time of a start of the engagement process of the clutch lies before the synchronization time, and the end of the engagement process of the clutch lies after the synchronization time, and wherein the clutch is open at a beginning of the start-up process.

2. A method for controlling the start-up phase of motor vehicles which are driven by an internal combustion engine and comprise an automatically actuated clutch, with the internal combustion engine being accelerated at first by a starter from standstill, with an engagement process of the clutch being startable from a predetermined threshold speed in order to initiate a start-up phase and with an injection process being started at a time after a synchronization time, wherein the time of a start of the engagement process of the clutch lies before the synchronization time, and the end of the engagement process of the clutch lies after the synchronization time, wherein the clutch is closed at the beginning of the start-up phase, and a transmission of the motor vehicle is in a idling position, whereupon the clutch is opened at a first point in time, whereupon a gear is engaged at a second point in time, whereupon the engagement process of the clutch is started at a third point in time and whereupon the injection process is started at a point in time after the synchronization time.

3. The method according to claim 1 or 2, wherein at a point in time at the start of the injection process an engine speed lies at least 100 $\text{min}^{-1}$ above a threshold speed at which a secure starting process is possible.

4. An apparatus for controlling a start-up phase of a motor vehicle which is equipped with an internal combustion engine and an automatic clutch, with the apparatus being arranged to trigger a starter in order to accelerate the internal combustion engine from the standstill and to start the engagement process of the clutch at a predetermined engine speed in order to initiate a start-up phase and to start an injection process at a time after a synchronization time, wherein the apparatus determines the start of the engagement time of the clutch prior to the synchronization time, and an end of the engagement process is determined after the synchronization time, wherein it keeps the clutch open initially.

5. An apparatus for controlling a start-up phase of a motor vehicle which is equipped with an internal combustion engine and an automatic clutch, with the apparatus being arranged to trigger a starter in order to accelerate the internal combustion engine from the standstill and to start the engagement process of the clutch at a predetermined engine speed in order to initiate a start-up phase and to start an injection process at a time after a synchronization time, wherein the apparatus determines the start of the engagement time of the clutch prior to the synchronization time, and an end of the engagement process is determined after the synchronization time, wherein it keeps the clutch closed at the beginning of the start-up phase, and the transmission of the motor vehicle is in an idle position, whereupon the clutch is opened at a first point in time, whereupon at a second point in time a gear is engaged, whereupon at a third point in time the engagement process of the clutch is started and thereafter the injection process is started at a synchronization time or thereafter.

6. A motor vehicle with an internal combustion engine, an automatic clutch and a control device for controlling the start-up phase which is arranged according to claim 4 or 5.

7. The motor vehicle according to claim 4 or 5, wherein a starter of the internal combustion engine is arranged as an integrated starter generator.

8. The motor vehicle according to claim 6, wherein a starter of the internal combustion engine is arranged as a belt-driven starter generator.

9. The motor vehicle according to claim 4 or 5, wherein the apparatus for controlling the start-up phase is in connection both with a camshaft sensor as well as a crankshaft sensor.

10. The motor vehicle according to claim 4 or 5, wherein a transmission of the motor vehicle is arranged as an automatic transmission.

11. The motor vehicle according to claim 10, wherein the transmission is arranged as a sequential transmission.

12. The motor vehicle according to claim 10, wherein the transmission is arranged as a double clutch transmission.

13. The motor vehicle according to claim 10, wherein the transmission is arranged as a continuously variable transmission.

14. The motor vehicle according to claim 4 or 5, wherein the motor vehicle is equipped with an automatic parking brake which is coupled with the controls of the start-up phase.

15. The motor vehicle according to claim 4 or 5, wherein the apparatus for controlling the start-up phase is connected with an inclination sensor for detecting an inclination of the vehicle in a longitudinal direction.

16. The motor vehicle according to claim 4 or 5, including a start-stop automatic system.

* * * * *